United States Patent [19]
Yamamoto et al.

[11] Patent Number: 6,051,663
[45] Date of Patent: Apr. 18, 2000

[54] LACTIC ACID POLYMERS

[75] Inventors: Motonori Yamamoto, Mannheim; Uwe Witt, Mutterstadt, both of Germany

[73] Assignee: BASF Aktiengesellschaft, Ludwigshafen, Germany

[21] Appl. No.: 09/145,991

[22] Filed: Sep. 3, 1998

[30] Foreign Application Priority Data

Sep. 12, 1997 [DE] Germany .............................. 197 40 111

[51] Int. Cl.$^7$ ...................................................... C08F 20/00
[52] U.S. Cl. ........................ 525/437; 528/272; 528/275; 528/296; 528/361; 524/81
[58] Field of Search .................................. 528/272, 275, 528/296, 361; 525/437; 524/81

[56] References Cited

U.S. PATENT DOCUMENTS 4,328,049  5/1982  Richardson .................. 148/9

FOREIGN PATENT DOCUMENTS

| 13 461 | 7/1980 | European Pat. Off. . |
| 565 235 | 10/1993 | European Pat. Off. . |
| 572 675 | 12/1993 | European Pat. Off. . |
| 618 249 | 10/1994 | European Pat. Off. . |
| 829 503 | 3/1998 | European Pat. Off. . |

OTHER PUBLICATIONS

Chem Abst. JP 91/10972.
Chem. Abst. JP 91/10971.
Chem. Abst. JP 82/59680.
Biodegradable Plactics and Polymers, Doi et al., 1994, Elsevier Sci., 492–497.
Sax Toxic Subs. Data Book, Fujiyama et al., 360; Jun. 1997.
Rompp Chem. Lex. Bd. 6, 1992, 4626–4633.
Rompp Chem. Lex. Bd. 6, 1992, 5136–5143.
B. Fortunato et al., Poly. Vol. 35, Nr.18, 4006–4010, 1994.
Kunststoff–Handbuch, Bd. 3/1, 1992, 24–28.

*Primary Examiner*—Samuel A. Acquah
*Attorney, Agent, or Firm*—Keil & Weinkauf

[57] ABSTRACT

Polymers based on
a) lactic acid or its $C_1$–$C_4$ alkyl esters or mixtures thereof,
b) at least one aliphatic $C_4$–$C_{10}$ dicarboxylic acid and
c) at least one $C_3$–$C_{10}$ alkanol containing from three to five hydroxyl groups.

20 Claims, No Drawings

LACTIC ACID POLYMERS

The present invention relates to polymers which are based on a) lactic acid or its $C_1$–$C_4$ alkyl esters or mixtures thereof,
b) at least one aliphatic $C_4$–$C_{10}$ dicarboxylic acid and
c) at least one $C_3$–$C_{10}$ alkanol containing from three to five hydroxyl groups as monomeric building blocks. In addition, the present invention relates to a process for the preparation of said polymers and to the use thereof in plasticine, non-permanent adhesives and biologically degradable polymer blends.

Polymeric reaction products of lactic acid are known. In addition to polylactide, copolymers or block copolymers based on lactic acid and other monomers are known. The lactic acid polymers of the prior art are mostly linear polymers, although branched lactic acid polymers have also been described. Thus biodegradable polyesters are described in JP91/10972 which are composed of lactic acid and a dihydric alcohol, a dicarboxylic acid and a trifunctional acid. They are polymerized in the presence of a germanium compound acting as catalyst and are useful for the manufacture of shaped articles. Suitable for the preparation of shaped articles are biodegradable polyesters which contain, in addition to lactic acid, dihydric alcohol and dicarboxylic acid, a hydroxycarboxylic acid containing four functional groups. These products are, according to JP91/10971, also prepared in the presence of a germanium compound acting as catalyst. Another branched lactic acid polymer having a high melt flow viscosity and a high molecular weight is revealed in JP82/59880. This reference describes a polymer of aliphatic dihydric alcohols, aliphatic dicarboxylic acids, lactic acid and a trifunctional aliphatic alcohol, which polymer is obtained by polymerization in the presence of germanium oxide.

It is an object of the present invention to provide a lactic polyester which by reason of its rubber-like properties is suitable for the preparation of plasticine and can be used as non-permanent adhesive or as a blend component in biodegradable polymer blends.

This object is satisfied by the polymer defined above.

In the present invention, the polymer is based on lactic acid (2-hydroxypopionic acid) as monomeric building block a). In this case the lactic acid used can be the optically active L- or D-form, or a mixture of the enantiomers may be used. In the present invention, the term "lactic acid" should be taken to include its intramolecular esters as well as its polymeric or oligomeric esters, which are present in commercially available aqueous lactic acid solutions as by-products. In general, the lactic acid is used as an aqueous solution. The concentration thereof generally ranges from 50 to 95 wt % and preferably from 80 to 95 wt %. Apart from lactic acid, the component a) may be a $C_1$–$C_4$ alkyl ester of lactic acid such as methyl lactate, ethyl lactate or n-butyl lactate. Component a) can, if desired, be a mixture of lactic acid and one or more lactates. We particularly prefer to use lactic acid alone. Usually the concentration of component a) in the polymers of the invention is from 40 to 95 wt % and preferably from 50 to 90 wt %, based on the total weight the polymer.

One, or a mixture of two or more, aliphatic $C_4$–$C_{10}$ dicarboxylic acids are used in the present invention as monomeric building blocks b). For example, the component b) used can be succinic acid, glutaric acid, adipic acid or pimelic acid, of which adipic acid is particularly preferred. In general, the concentration of component b) in the polymers is from 4 to 40 wt % and preferably from 5 to 30 wt %, based on the total weight of the polymer.

The monomeric building blocks c) used in the present invention can comprise one, or a mixture of two or more, $C_3$–$C_{10}$ alkanols containing from three to five hydroxyl groups. The alkanols can exhibit linear or branched alkyl chains, linear chains being preferred. Examples of suitable alkanols for this purpose are glycerol, trimethylol propane, pentaerythritol or sorbitol, glycerol (1,2,3-trihydroxypropane) being particularly preferred. The concentration of component c) in the polymers is generally from 1 to 20 wt % and preferably from 5 to 20 wt %, based on the total weight of the polymer. If the content of the component c) is higher, gelatinous polymers are obtained.

Processes for the preparation of lactic acid polymers are known per se. For example, such processes are described in EP-A1-572.675 or Biodegradable Plastics and Polymers, Elsevier Verlag, 1994, pp. 492, so that further information thereon is unnecessary.

The polymers of the invention can be prepared with the addition of suitable, known catalysts such as metal compounds based on the following elements: Ti, Ge, Zn, Fe, Mn, Co, Zr, V, Ir, La, Ce, Li, and Ca, preferably organometallic compounds based on these metals such as salts of organic acids, alkoxides, acetylacetonates, more preferably those based on zinc, tin or titanium.

When the polymers of the invention are used, for example, in the packaging industry eg for foodstuffs, is it usually desirable to set the content of catalyst used to as low a level as possible and to avoid the use of toxic compounds. Unlike other heavy metals such as lead, tin, antimony, cadmium, chromium etc., titanium and zinc compounds are not usually toxic ("Sax Toxic Substance Data Book", Shizuo Fujiyama, Maruzen, K. K., pp. 360, (in EP-A 565,235) cf R ömpp Chemie Lexikon, Vol. 6, Thieme Verlag Stuttgart, New York, 9th Edition, 1992 pp. 4626 to 4633 and 5136 to 5143). Examples which may be mentioned are: dibutoxy diacetoacetoxy titanium, tetrabutyl orthotitanate and zinc(II) acetate.

The ratio, by weight, of catalyst to polymer usually ranges from 0.01:100 to 3:100 and preferably from 0.05:100 to 2:100, whilst in the case of highly active titanium compounds even smaller amounts can be used such as 0.0001:100.

The catalyst can be added when the reaction commences or just prior to the separation of excess component C or, if desired, in a number of portions distributed over the process of preparing the polymers. If desired, different catalysts or mixtures thereof can be used. However, we particularly prefer to polymerize the monomers in the absence of a catalyst.

Usually the conversion of the monomers a), b) and c) to the polymers of the invention takes place in the absence of any additional solvent. Polymerization is usually carried out at temperatures ranging from 130° to 180° C. and preferably from 160° to 170° C. It is possible to make premixes of a and c) or b) and c) and to subsequently polymerize them with b) or a) respectively or all of the components can be present in the initial batch.

It may be advantageous to carry out the reaction under an atmosphere of inert gas, for example nitrogen. In order to remove the water from the reaction mixture, it may also be advantageous to carry out the reaction under reduced pressure or in a stream of inert gas.

In order to avoid undesirable decomposition reactions and/or side reactions, stabilizing agents may be added in this processing stage, if desired. Examples of such stabilizing agents are the phosphorus compounds that are described in EP-A 13,461, U.S. Pat. No. 4,328,049 or in b) Fortunato et al., Polymer, Vol. 35, No. 18, pp. 4006 to 4010, 1994 Butterworth-Heinemann Ltd. Some of these may act as deactivators on the aforementioned catalysts. Examples which may be mentioned are: organophosphites, phosphonous acid and phosphorous acid. Examples of compounds acting solely as stabilizing agents are: trialkyl phosphites, triphenyl phosphite, trialkyl phosphates, triphenyl phosphate and tocopherol (vitamin E; available for example as Uvinul® 2003AO (BASF)).

The polymers of the invention are characterized by molecular weights ($M_n$) ranging from 1,000 to 100,000 g/mol and preferably from 3,000 to 30,000 g/mol and viscosity numbers ranging from 10 to 500 g/mL and preferably from 50 to 300 g/mL (measured in a 1:1 w/w mixture of o-chlorobenzene and phenol, the concentration being 0.5 wt %). The polyesters of the invention have glass transition temperatures ranging from −20° to 50° C. and preferably from −10° to 40° C. The intrinsic color of the polymers of the invention is of a light shade and the polymers are rubber-like and slightly tacky. When kneaded the polymers entrap air.

The tackiness of the polymers of the invention can be reduced by adding fillers or can be adjusted for use as adhesives by adding suitable tackifying resins, preferably natural resins such as shellac, acroide resins or gum rosin to give the desired adhesive strength on surfaces such as skin, paper or cellulose.

Based on the polymers of the invention, there can be added from 0 to 80 wt % of fillers. Suitable fillers are for example carbon black, starch, lignin powder, cellulose fibers, natural fibers such as sisal and hemp, iron oxides, clay minerals, ores, calcium carbonate, calcium sulphate, barium sulphate and titanium(IV) oxide. The fillers may contain, if desired, one or more stabilizing agents such as tocopherol (vitamin E), organic phosphorus compounds, mono-, di- and poly-phenols, quinols, diarylamines, dialkyl sulphides, UV stabilizers, nucleating agents such as talcum powder and also lubricants and release agents based on hydrocarbons, fatty alcohols, higher carboxylic acids, metal salts of higher carboxylic acids such as calcium and zinc stearates, and waxes, eg montan wax, beeswax, candelilla wax or camauba wax. Such stabilizing agents etc. are described in detail in Kunststoffhandbuch Vol. 3/1 Carl Hanser Verlag Munich, 1992, pp. 24 to 28.

The polymers of the invention can be dyed by the addition of organic or inorganic colorants as desired. The colorants may be regarded as fillers in the widest sense of this term. We particularly prefer to use colorants which are physiologically acceptable such as sicuran blue, titanium(IV) oxide or iron oxide.

The polymers of the invention are particularly suitable for the preparation of plasticine, since they are physiologically acceptable, have a rubbery consistency and can in addition exhibit air pockets when kneaded.

According to another preferred embodiment, the polymers of the invention can be applied as adhesives to surfaces, for example by brush or roller coating. The polymers of the invention are particularly suitable for the preparation of adhesives intended to make it possible to reseparate adhering sheets of paper some time later. Since the polymers of the invention are also biodegradable, paper or cellulose that is coated with a layer thereof can be very simply disposed of, for example by composting.

Furthermore, the polymers of the invention can be used for the preparation of polymer blends. The other polymeric constituents of such a blend are preferably likewise biodegradable. The blend partners used may be, for example, biodegradable partially aromatic copolyesters, such as are described, for example, in DE-A4,440,858.

EXAMPLE 10 mol (1000 g) of lactic acid (as 90 wt % strength solution in water), 3 mol (438 g) of adipic acid and 3 mol (276 g) of glycerol were mixed and caused to react at 150° C. under atmospheric pressure. The pressure was then lowered to 5 mbar and the reaction mixture was stirred at 170° C. over a period of two hours. The resulting polymer had rubber-like properties at room temperature and was colorless and slightly tacky.

We claim:

1. A polymer consisting of monomer units formed from the following monomers
    a) lactic acid or a $C_1$–$C_4$ alkyl ester of lactic acid, or mixtures thereof,
    b) at least one aliphatic $C_4$–$C_{10}$ dicarboxylic acid, and
    c) at least one $C_3$–$C_{10}$ alkanol containing from three to five hydroxyl groups.

2. The polymer defined in claim 1, wherein the monomer a) is lactic acid, the monomer b) is adipic acid, and the monomer c) is glycerol.

3. A process for the preparation of a polymer consisting of monomer units formed from the following monomers
    a) lactic acid or a $C_1$–$C_4$ alkyl ester of lactic acid, or mixtures thereof,
    b) at least one aliphatic $C_4$–$C_{10}$ dicarboxylic acid, and
    c) at least one $C_3$–$C_{10}$ alkanol containing from three to five hydroxyl groups,
    wherein the monomers a), b) and c) are intermixed and polymerized in the absence of a catalyst.

4. A plasticine whenever containing a polymer as defined in claim 1.

5. A non-permanent adhesive whenever containing a polymer as defined in claim 1.

6. A biodegradable polymer blend whenever containing the polymer as defined in claim 1.

7. A polymer consisting of monomer units formed from the following monomers
    a) from 40 to 95% by weight of lactic acid or a $C_1$–$C_4$ alkyl ester of lactic acid, or mixtures thereof,
    b) from 4 to 40% by weight of at least one aliphatic $C_4$–$C_{10}$ dicarboxylic acid, and
    c) from 1 to 20% by weight of at least one $C_3$–$C_{10}$ alkanol containing from three to five hydroxyl groups.

8. A polymer essentially consisting of monomer units formed from the following monomers
    a) from 50 to 90% by weight of lactic acid,
    b) from 5 to 30% by weight of adipic acid, and
    c) from 5 to 20% by weight of glycerol.

9. A polymer blend comprising, in addition to the polymer defined in claim 1, an effective amount of at least one of the following constituents: a stabilizing agent, a filler, a tackifying resin, a UV stabilizer, a nucleating agent, a lubricant, a release agent, an organic colorant and an inorganic colorant.

10. A polymer blend comprising, in addition to the polymer defined in claim 1, at least one biodegradable partially aromatic copolyester.

11. A polymer blend comprising, in addition to the polymer defined in claim 2, an effective amount of at least one of the following constituents: a stabilizing agent, a filler, a tackifying resin, a UV stabilizer, a nucleating agent, a lubricant, a release agent, an organic colorant and an inorganic colorant.

12. A polymer blend comprising, in addition to the polymer defined in claim 2, at least one biodegradable partially aromatic copolyester.

13. A plasticine comprising the polymer defined in claim 2.

14. A non-permanent adhesive comprising the polymer defined in claim 2.

15. A biodegradable polymer blend comprising the polymer defined in claim 2.

16. A polymer blend comprising, in addition to the polymer defined in claim 8, an effective amount of at least one of the following constituents: a stabilizing agent, a filler, a tackifying resin, a UV stabilizer, a nucleating agent, a lubricant, a release agent, an organic colorant and an inorganic colorant.

17. A plasticine comprising the polymer defined in claim 8.

18. A non-permanent adhesive comprising the polymer defined in claim 8.

19. A biodegradable polymer blend comprising the polymer defined in claim 8.

20. A polymer blend comprising, in addition to the polymer defined in claim 8, at least one biodegradable partially aromatic copolyester.

\* \* \* \* \*